(12) United States Patent
Robinson et al.

(10) Patent No.: US 9,067,734 B1
(45) Date of Patent: Jun. 30, 2015

(54) MATTRESS MOVING AID

(71) Applicants: Glen Robinson, San Jacinto, CA (US); Marisela Saldana, San Jacinto, CA (US)

(72) Inventors: Glen Robinson, San Jacinto, CA (US); Marisela Saldana, San Jacinto, CA (US)

( * ) Notice: Subject to any disclaimer, the term of this patent is extended or adjusted under 35 U.S.C. 154(b) by 0 days.

(21) Appl. No.: 14/257,305

(22) Filed: Apr. 21, 2014

(51) Int. Cl.
*B65G 7/12* (2006.01)

(52) U.S. Cl.
CPC ........................ *B65G 7/12* (2013.01)

(58) Field of Classification Search
USPC .............. 294/15, 92, 167, 168; 224/157, 270, 224/272; 280/47.18
See application file for complete search history.

(56) References Cited

U.S. PATENT DOCUMENTS

| | | | |
|---|---|---|---|
| 927,506 A | 7/1909 | Donner | |
| 2,178,738 A * | 11/1939 | Chenette | 294/15 |
| 2,274,918 A * | 3/1942 | Chenette | 294/15 |
| 2,359,193 A | 9/1944 | Bechik | |
| 2,367,627 A * | 1/1945 | Sterrett | 294/15 |
| 2,508,795 A | 5/1950 | Nielsen | |
| 2,551,097 A * | 5/1951 | Cole | 414/458 |
| 2,604,210 A | 7/1952 | Boone | |
| 2,739,007 A * | 3/1956 | Rauterberg | 294/15 |
| 3,136,429 A * | 6/1964 | Kleinschmidt | 414/809 |
| 3,214,072 A | 10/1965 | Brown | |
| 3,214,209 A * | 10/1965 | Stone | 294/15 |
| 4,119,250 A | 10/1978 | Brutlag | |
| 4,358,124 A * | 11/1982 | Geschwender | 280/47.18 |
| 4,431,226 A | 2/1984 | Weilert | |
| 4,953,904 A * | 9/1990 | Danboise | 294/15 |
| 5,102,178 A | 4/1992 | Staats, Jr. | |
| 5,863,056 A | 1/1999 | Hostetter | |
| 6,032,345 A | 3/2000 | Resta | |
| 6,085,370 A | 7/2000 | Lobascio | |
| 6,186,566 B1 * | 2/2001 | Frederickson | 294/15 |
| 6,309,000 B1 * | 10/2001 | Pittman | 294/15 |
| 2008/0104753 A1 | 5/2008 | Kajdas | |
| 2012/0043775 A1 * | 2/2012 | Villa | 294/15 |

* cited by examiner

*Primary Examiner* — Dean Kramer
(74) *Attorney, Agent, or Firm* — Richard L. Miller

(57) ABSTRACT

A carrier detachably engaging opposing ends of an unfolded and upright mattress and utilizing a pair of movers to move the unfolded and upright mattress. The carrier includes a pair of frames. The pair of frames detachably engage the opposing ends of the unfolded and upright mattress, respectively, and utilize the pair of movers to move the unfolded and upright mattress.

87 Claims, 5 Drawing Sheets

MATTRESS MOVING AID

BACKGROUND OF THE INVENTION

1. Field of the Invention

The present invention relates to a moving aid, and more particularly, a mattress moving aid.

2. Description of the Prior Art

Numerous innovations for mattress moving devices have been provided in the prior art that will be described. Even though these innovations may be suitable for the specific individual purposes to which they address, however, they differ from the present invention.

A FIRST EXAMPLE, U.S. Pat. No. 927,506, Issued on Jul. 13, 1909, to Donner teaches a device for carrying mattresses, which includes a middle frame portion, including four standards, and a separate bar attached to each of two opposite pairs of the standards. The same being placed below the upper ends of the standards. Each bar projects beyond each leg of the pair to which it is attached. A horizontally disposed cross member is secured to, and connects, the two bars, a separate member is pivotally attached at one of its ends to one of the projecting ends of each bar, a standard is pivotally attached between its ends to the free end of each of the members, and a single upper frame portion is pivotally attached at its ends to the upper free extremity of two opposite standards of the pairs of standards first described and having the upper ends of the last described standards pivoted thereto. The frame portions are adapted to fold parallel to one another. Cross supporting members are secured to both the latter, and cooperating latch members are carried by the frame portions for holding them in their folded positions.

A SECOND EXAMPLE, U.S. Pat. No. 2,359,193, Issued on Sep. 26, 1944, to Bechik teaches a mattress, a spaced pair of grommets extend through a wall of the mattress and have out-turned annular anchoring flanges on opposite sides of the wall, a lock washer is applied over each grommet inside of the mattress wall and locked in place by the inner anchoring flanges thereof, and a pair of clamp plates are applied over the lock washer and are anchored thereto at their peripheries. The clamp plates have circumferentially spaced and radially inwardly projecting spring teeth with sharp edges defining axial apertures in alignment with the axial apertures of the cooperating grommets. A pre-formed solid handle lies along the exterior of the mattress wall and has integral in-turned ends inserted inwardly through the grommets and clamp plate apertures and in frictional locking engagement with the latter.

A THIRD EXAMPLE, U.S. Pat. No. 2,508,795, Issued on May 23, 1950, to Nielsen teaches an article including a girth strap, a buckle carried at one end of the girth strap for detachable securing the two opposite end portions thereof about an article to be carried, a support strap having one portion thereof secured to the girth strap so that the support strap extends transversely away from the girth strap, a second buckle carried by the girth strap at a location normally remote from the support strap for detachable securing the free end of the support strap to the girth strap so that the support strap partially encircles the article to be carried, and a plurality of spaced handle members secured to the girth strap so as to project away from the girth strap in a direction opposite to that of the support strap. One of the handle members is mounted adjacent to the second buckle.

A FOURTH EXAMPLE, U.S. Pat. No. 2,604,210, Issued on Jul. 22, 1952, to Boone teaches a mattress carrying device including a moveable and elongated base and a frame on the base forming two narrow mattress receiving racks. The racks extend longitudinally of the base to maintain in vertical position mattresses disposed in the racks and on the base. A roller is mounted on the frame above and between the racks. The roller is rotatable about an axis extending parallel to, and longitudinally of, the base.

A FIFTH EXAMPLE, U.S. Pat. No. 3,214,072, Issued on Oct. 26, 1965, to Brown teaches a sling for carrying a mattress in an upright position, which includes a flexible strap of webbing material forming first and second closed loops. The loops form a pair of joined strands. A loop-joining apparatus joins the loops together at one point on the periphery of each loop to form a generally figure-8 configuration, and cradle-forming apparatus spaced from the loop joining apparatus extends between opposite strands of each loop for defining a mattress supporting cradle. Each loop extends from the cradle-forming apparatus in a direction opposite from the loop-joining apparatus by an amount sufficient to permit strands of each loop to opposite side surfaces of the mattress so as to afford lateral support for the mattress, whereby the mattress can be lifted by manually engaging the loop at a point remote from the loop-joining apparatus.

A SIXTH EXAMPLE, U.S. Pat. No. 4,119,250, Issued on Oct. 10, 1978, to Brutlag teaches a heavy cloth-like material that is shaped as a rectangular parallelepiped and has sides or ends with a length corresponding to the length of a king-sized mattress and a bottom with a width corresponding to the thickness of a king-sized mattress. A pair of carrying straps of endless square configuration are affixed to the bottom of the material and to the sides at corresponding opposite ends of the parallelepiped. The straps extend in loops from the opposite ends of the parallelepiped at angles with the bottom, whereby two people, each holding the extending part of a corresponding one of the straps, support and carry a mattress placed in the material and resting on the bottom thereof.

A SEVENTH EXAMPLE, U.S. Pat. No. 4,431,226, Issued on Feb. 14, 1984, to Weilert teaches wrap-around band or strap mattress carriers to enable two people to carry large and cumbersome mattresses. Variably adjustable wrap-around band and strap mattress carrying and handling devices are adjustable and useable to fit and carry more than one size of mattress.

AN EIGHTH EXAMPLE, U.S. Pat. No. 5,102,178, Issued on Apr. 7, 1992, to Staats, Jr. teaches a carrying device including an elongate and flexible cord folded to define two cord lengths, with a rigid tubular handle slidably mounted at the bight portion of the cord lengths. The cord lengths are alternately engaged through opposed ends of intermediately rigid tubular supports, crossing within each support, and extending beyond the supports through the opposed ends of a second handle. The supports and the second handle slidably adjust along the carrying device, with the length of the carrying device fixed by a knot between the end portions of the lines beyond the second handle.

A NINTH EXAMPLE, U.S. Pat. No. 5,863,056, Issued on Jan. 26, 1999, to Hostetter teaches a mattress moving system that includes a horizontal strap with two detachable, rotating, and adjustable handles, a pair of vertical straps. Each vertical strap has an expandable, detachable, and position-adjustable castered platform. The horizontal strap wraps around, and is secured to, the mattress lengthwise, while the handles are positioned on opposite mattress end edges. The vertical straps extend from the horizontal strap on opposite sides of the mattress and wrap halfway around the mattress widthwise, while the castered platforms are positioned on the mattress side edges and slidably attached to each vertical strap. Quick-release buckles allow the horizontal and vertical straps to be adjusted to fit any size mattress, box springs, or other similarly shaped object to be moved.

A TENTH EXAMPLE, U.S. Pat. No. 6,032,345, Issued on Mar. 7, 2000, to Resta teaches an apparatus having a structure with two frames that can move towards each other, and between which, a mattress is locked. The frames support a plurality of devices for applying quilting braces. Each device includes a needle to which a quilting brace is coupled. The needle is driven through the mattress. On the other side of the mattress, there is a unit that applies a tuft to the quilting brace guided by the needle. During this operation, the mattress is compressed so that once it is released, it expands and tensions the applied quilting braces.

AN ELEVENTH EXAMPLE, U.S. Pat. No. 6,085,370, Issued on Jul. 11, 2000, to Lobascio teaches a cover for a mattress that is usable when the mattress is to be moved. The cover covers the periphery, and flap portions cover a portion of both sides of the mattress. A plurality of peripherally spaced handle straps are riveted to the peripheral portion and the flap portions of the cover, and are graspable to move the mattress. In one embodiment, a loop is formed on the inner end of each strap, and an elastic cord passes through the loops and its ends are secured together to hold the cover on the mattress. In a second embodiment, the cord passes through a hem formed in the inner end of the flap, and there are no loops on the straps.

A TWELFTH EXAMPLE, U.S. Patent Office Document No. 2008/0104753, Published on May 8, 2008, to Kajdas teaches a device for covering and facilitating the transport of a mattress. The device includes a material cover that encloses the mattress, a zipper or other fastening apparatus for closing the cover, a plurality of handles to allow the user to lift, orient, and maneuver the mattress, and a plurality of wheels or casters to permit the user to move the enclosed mattress.

It is apparent now that numerous innovations for mattress moving devices have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a mattress moving aid that avoids the disadvantages of the prior art.

ANOTHER OBJECT of the present invention is to provide a mattress moving aid that is simple and inexpensive to manufacture.

STILL ANOTHER OBJECT of the present invention is to provide a mattress moving aid that is simple to use.

BRIEFLY STATED, STILL YET ANOTHER OBJECT of the present invention is to provide a carrier detachably engaging opposing ends of an unfolded and upright mattress and utilizing a pair of movers to move the unfolded and upright mattress. The carrier includes a pair of frames. The pair of frames detachably engage the opposing ends of the unfolded and upright mattress, respectively, and utilize the pair of movers to move the unfolded and upright mattress.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
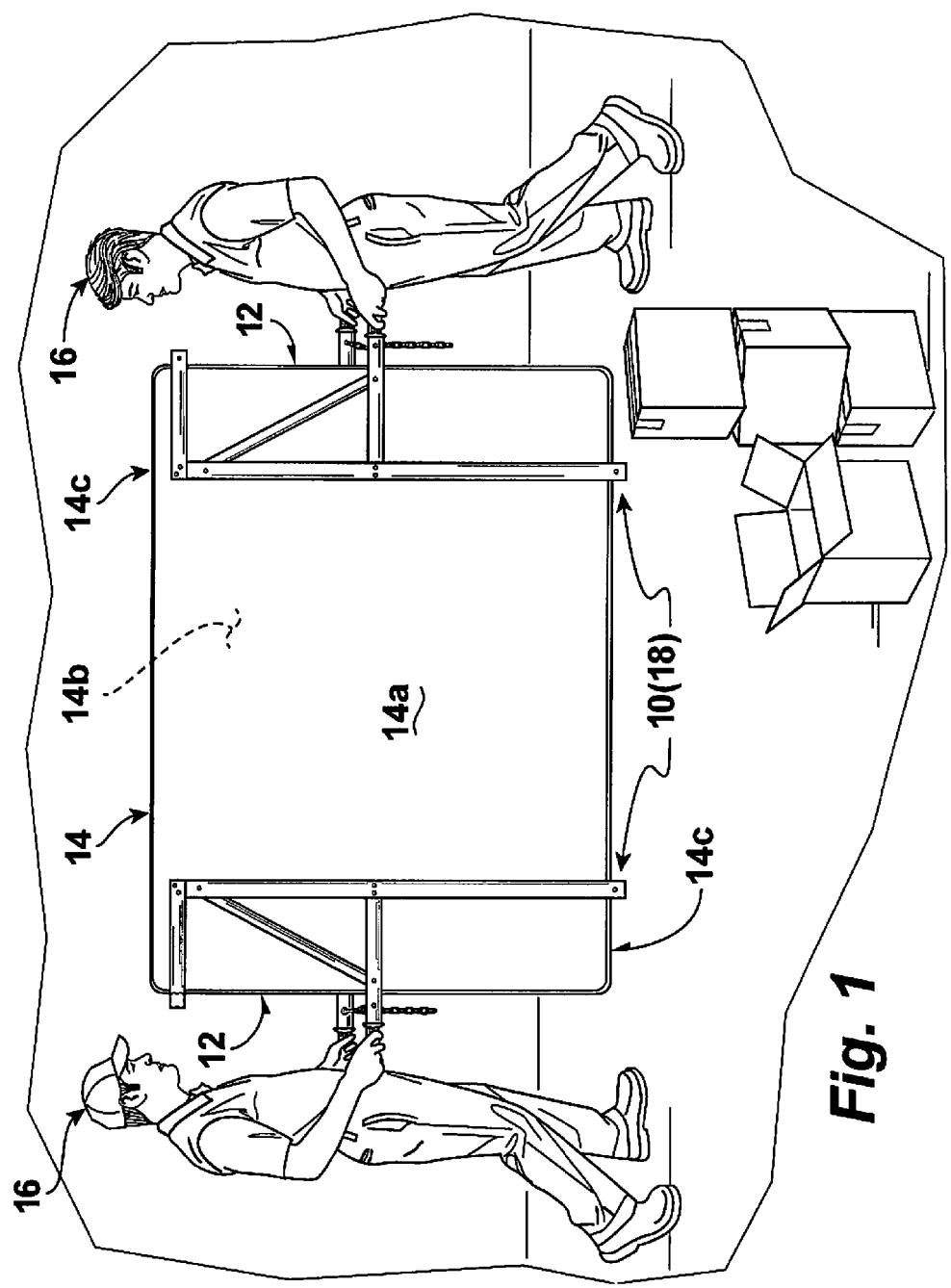
FIG. 1 is a diagrammatic perspective view illustrating a pair of braces of the present invention being used to move a mattress.
Figure 2:
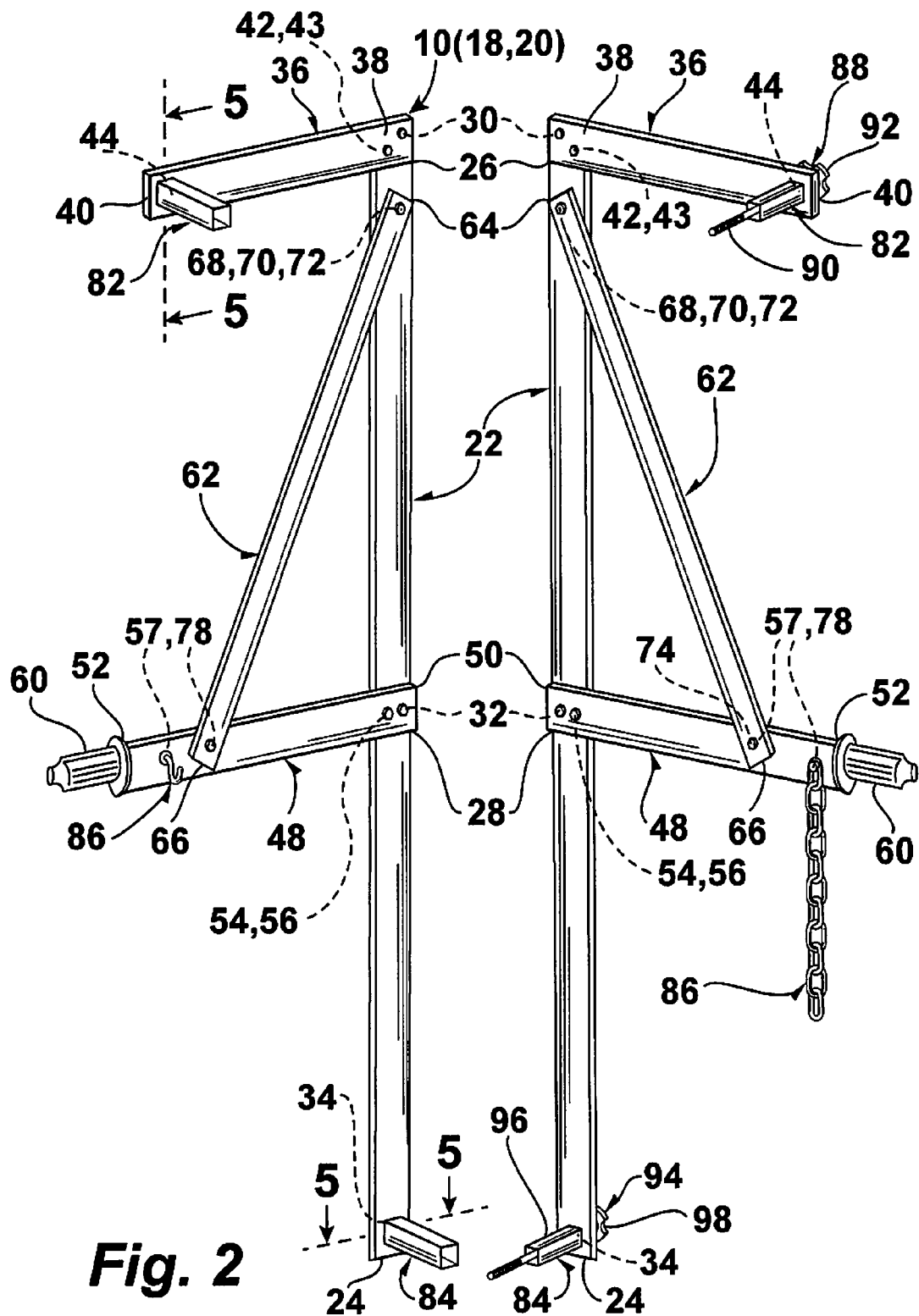
FIG. 2 is a diagrammatic perspective view illustrating the two halves of the present invention separated from each other.
Figure 3:
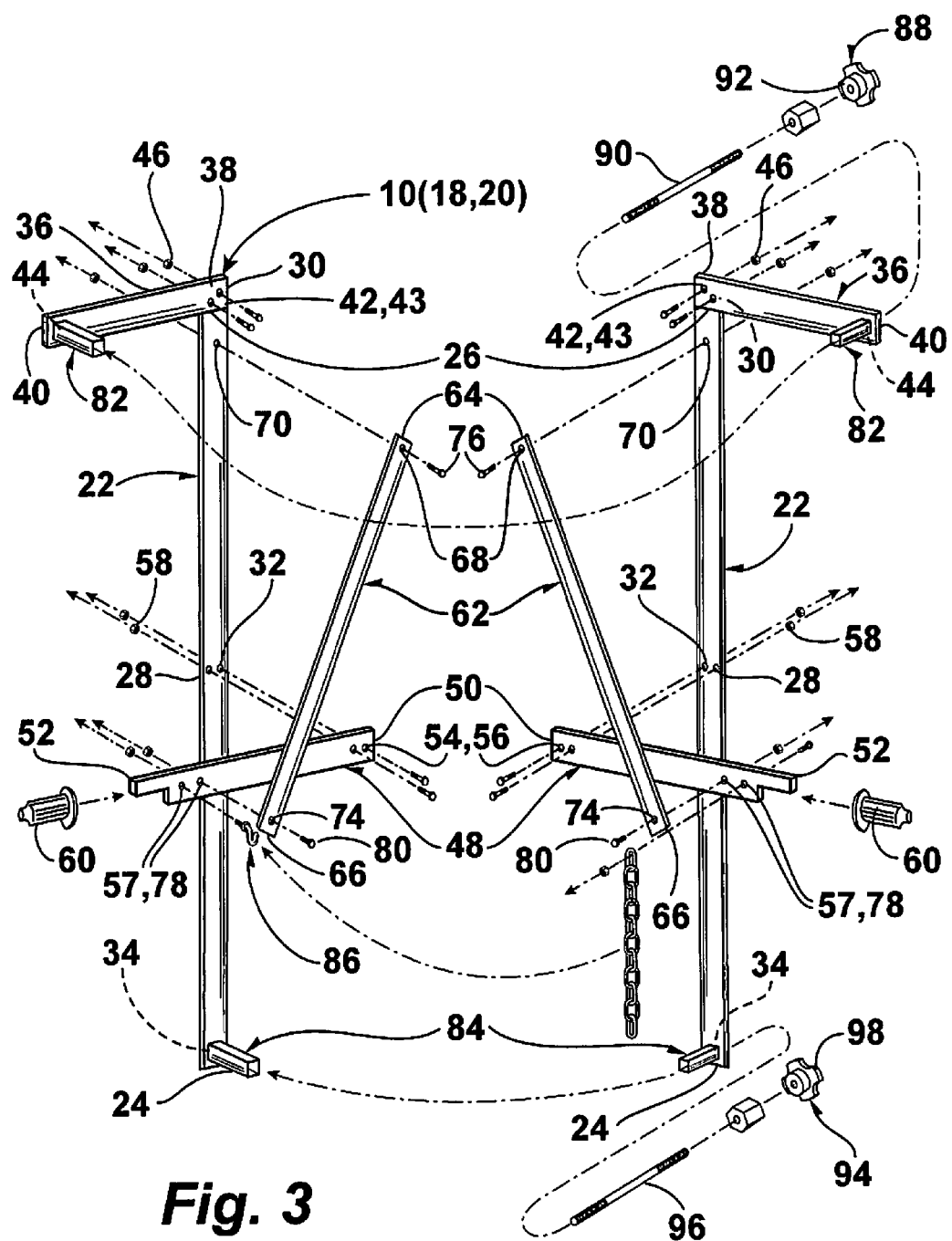
FIG. 3 is a diagrammatic perspective assembly view illustrating the various components of the present invention cooperating and securing with each other.
Figure 4:
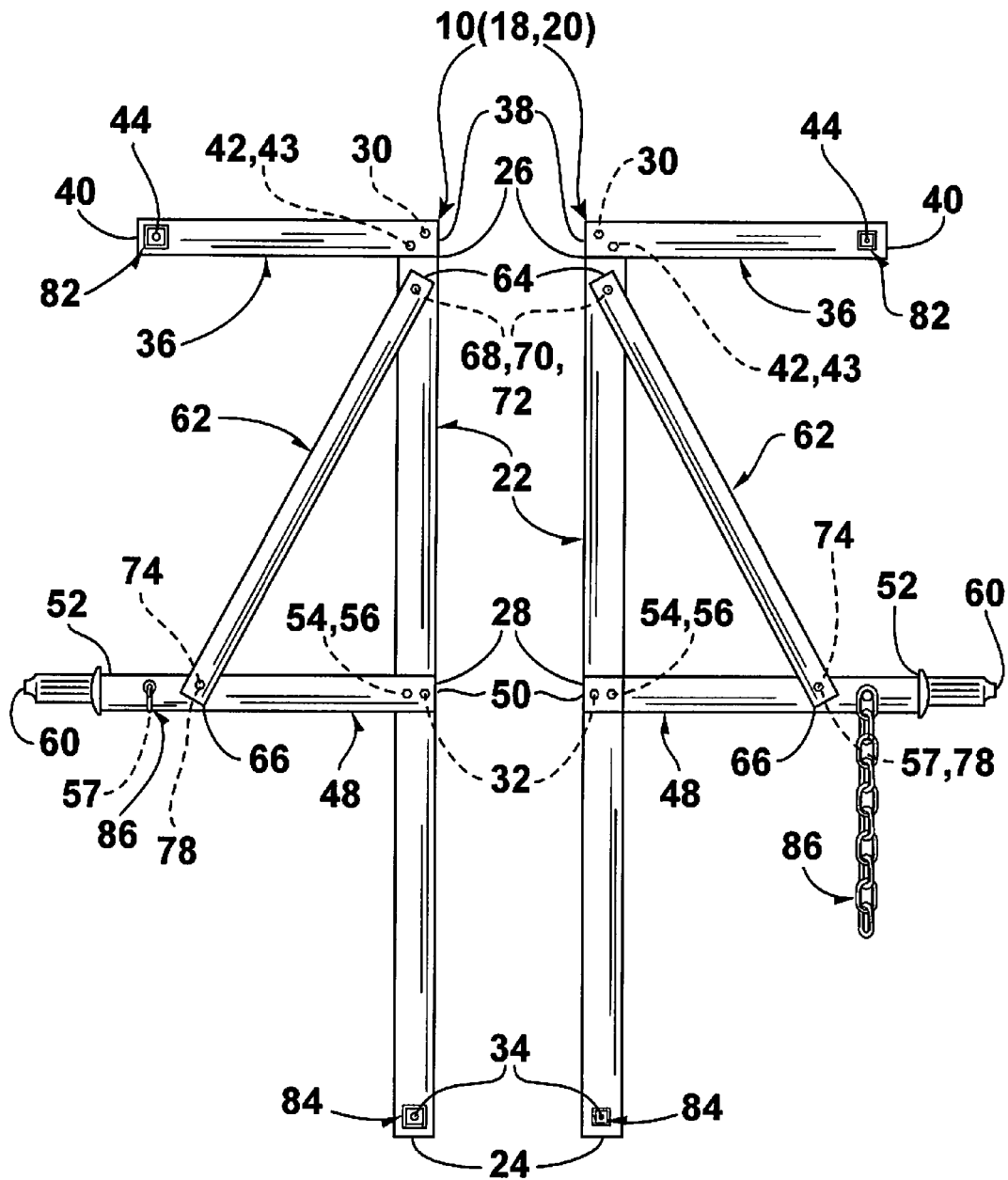
FIG. 4 is a side elevational view of two halves of the present invention showing the sides which would face a mattress when in use.
Figure 5:
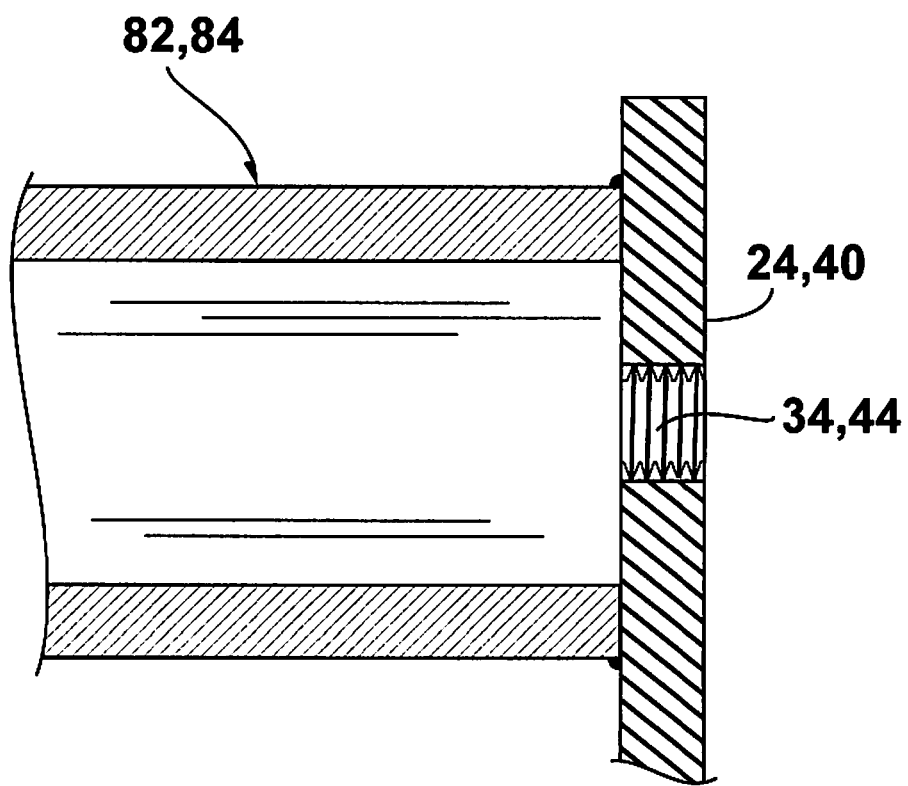
FIG. 5 is a cross sectional view taken on line 5-5 in FIG. 2.

A MARSHALING OF REFERENCE NUMERALS UTILIZED IN THE DRAWING 10 carrier of embodiments of present invention for detachably engaging opposing ends 12 of unfolded and upright mattress 14 and for utilizing pair of movers 16 to move unfolded and upright mattress 14
12 opposing ends of unfolded and upright mattress 14
14 unfolded and upright mattress
14a top surface of unfolded and upright mattress 14
14b bottom surface of unfolded and upright mattress 14
14c pair of sides of unfolded and upright mattress 14
16 pair of movers
18 pair of frames for detachably engaging opposing ends 12 of unfolded and upright mattress 14, respectively, and for utilizing pair of movers 16 to move unfolded and upright mattress 14
20 pair of mirror image structures of each frame of pair of frames 18 for maintaining pair of opposing ends of unfolded and upright mattress 14, respectively, therebetween
22 upright member of each mirror image structure of pair of mirror image structures 20 of each frame of pair of frames 18
24 lowermost end of upright member 22 of each mirror image structure of pair of mirror image structures 20 of each frame of pair of frames 18
26 uppermost end of upright member 22 of each mirror image structure of pair of mirror image structures 20 of each frame of pair of frames 18
28 intermediate point of upright member 22 of each mirror image structure of pair of mirror image structures 20 of each frame of pair of frames 18
30 through bores of uppermost end 26 of upright member 22 of each mirror image structure of pair of mirror image structures 20 of each frame of pair of frames 18
32 through bores of intermediate point 28 of upright member 22 of each mirror image structure of pair of mirror image structures 20 of each frame of pair of frames 18
34 through bore of lowermost end 24 of upright member 22 of each mirror image structure of pair of mirror image structures 20 of each frame of pair of frames 18
36 upper transverse member of each mirror image structure of pair of mirror image structures 20 of each frame of pair of frames 18
38 proximal end of upper transverse member 36 of each mirror image structure of pair of mirror image structures 20 of each frame of pair of frames 18

40 distal end of upper transverse member 36 of each mirror image structure of pair of mirror image structures 20 of each frame of pair of frames 18

42 through bores of proximal end 38 of upper transverse member 36 of each mirror image structure of pair of mirror image structures 20 of each frame of pair of frames 18

43 upper aligned through bores of each mirror image structure of pair of mirror image structures 20 of each frame of pair of frames 18

44 through bore of distal end 40 of upper transverse member 36 of each mirror image structure of pair of mirror image structures 20 of each frame of pair of frames 18

46 upper set of nuts and bolts of each mirror image structure of pair of mirror image structures 20 of each frame of pair of frames 18

48 intermediate transverse member of each mirror image structure of pair of mirror image structures 20 of each frame of pair of frames 18

50 proximal end of intermediate transverse member 48 of each mirror image structure of pair of mirror image structures 20 of each frame of pair of frames 18

52 distal end of intermediate transverse member 48 of each mirror image structure of pair of mirror image structures 20 of each frame of pair of frames 18

54 through bores of proximal end 50 of intermediate transverse member 48 of each mirror image structure of pair of mirror image structures 20 of each frame of pair of frames 18

56 intermediate aligned through bores of each mirror image structure of pair of mirror image structures 20 of each frame of pair of frames 18

57 through bores of distal end 52 of intermediate transverse member 48 of each mirror image structure of pair of mirror image structures 20 of each frame of pair of frames 18

58 intermediate set of nuts and bolts of each mirror image structure of pair of mirror image structures 20 of each frame of pair of frames 18

60 grip of intermediate transverse member 48 of each mirror image structure of pair of mirror image structures 20 of each frame of pair of frames 18

62 brace of each mirror image structure of pair of mirror image structures 20 of each frame of pair of frames 18

64 upper end of brace 62 of each mirror image structure of pair of mirror image structures 20 of each frame of pair of frames 18

66 lower end of brace 62 of each mirror image structure of pair of mirror image structures 20 of each frame of pair of frames 18

68 through bore of upper end 64 of brace 62 of each mirror image structure of pair of mirror image structures 20 of each frame of pair of frames 18

70 through bore of uppermost end 26 of upright member 22 of each mirror image structure of pair of mirror image structures 20 of each frame of pair of frames 18

72 lower upper aligned through bores of each mirror image structure of pair of mirror image structures 20 of each frame of pair of frames 18

74 through bore of lower end 66 of brace 62 of each mirror image structure of pair of mirror image structures 20 of each frame of pair of frames 18

76 lower upper set of nuts and bolts of each mirror image structure of pair of mirror image structures 20 of each frame of pair of frames 18

78 lower aligned through bores of each mirror image structure of pair of mirror image structures 20 of each frame of pair of frames 18

80 lower set of nuts and bolts of each mirror image structure of pair of mirror image structures 20 of each frame of pair of frames 18

82 upper connector member of each mirror image structure of pair of mirror image structures 20 of each frame of pair of frames 18

84 lower connector member of each mirror image structure of pair of mirror image structures 20 of each frame of pair of frames 18

86 combination eye hook and chain of each frame of pair of frames 18

88 upper locking member of one mirror image structure of pair of mirror image structures 20 of each frame 18

90 threaded rod of upper locking member 88 of one mirror image structure of pair of mirror image structures 20 of each frame 18

92 knob of upper locking member 88 of one mirror image structure of pair of mirror image structures 20 of each frame 18

94 lower locking member of one mirror image structure of pair of mirror image structures 20 of each frame 18

96 threaded rod of lower locking member 94 of one mirror image structure of pair of mirror image structures 20 of each frame 18

98 knob of lower locking member 94 of one mirror image structure of pair of mirror image structures 20 of each frame 18

DETAILED DESCRIPTION OF THE PREFERRED EMBODIMENT

Referring now to the figures, in which like numerals indicate like parts, and particularly to FIG. 1, the carrier of the embodiments of the present invention is shown generally at 10 for detachably engaging opposing ends 12 of an unfolded and upright mattress 14 and for utilizing a pair of movers 16 to move the unfolded and upright mattress 14, wherein the unfolded and upright mattress 14 further has a top surface 14a, a bottom surface 14b, and a pair of sides 14c.

The carrier 10 comprises a pair of frames 18. The pair of frames 18 are for detachably engaging the opposing ends 12 of the unfolded and upright mattress 14, respectively, and for utilizing the pair of movers 16 to move the unfolded and upright mattress 14.

The configuration of the pair of frames 18 can best be seen in FIGS. 2, 3, 4, and 5, and as such, will be discussed with reference thereto.

Each frame 18 comprises a pair of mirror image structures 20. The pair of mirror image structures 20 of each frame 18 are for maintaining the pair of opposing ends 12 of the unfolded and upright mattress 14, respectively, therebetween.

Each mirror image structure 20 of each frame 18 includes an upright member 22.

The upright member 22 of each mirror image structure 20 of each frame 18 is vertically oriented, flat for not damaging the top surface 14a of the unfolded and upright mattress 14 and the bottom surface 14b of the unfolded and upright mattress 14 when resting thereagainst during use, straight, slender, elongated, and has a lowermost end 24, an uppermost end 26, and an intermediate point 28.

The intermediate point 28 of each mirror image structure 20 of each frame 18 is disposed between the lowermost end 24 of an associated mirror image structure 20 of an associated frame 18 and the uppermost end 26 of the associated mirror image structure 20 of the associated frame 18.

The uppermost end 26 of the upright member 22 of each mirror image structure 20 of each frame 18 has through bores 30 therethrough.

The intermediate point 28 of the upright member 22 of each mirror image structure 20 of each frame 18 has through bores 32 therethrough.

The lowermost end 24 of the upright member 22 of each mirror image structure 20 of each frame 18 has a through bore 34 therethrough.

Each mirror image structure 20 of each frame 18 further includes an upper transverse member 36.

The upper transverse member 36 of each mirror image structure 20 of each frame 18 is horizontally oriented, flat for not damaging the top surface 14a of the unfolded and upright mattress 14 and the bottom surface 14b of the unfolded and upright mattress 14 when resting thereagainst during use, straight, slender, elongated, and has a proximal end 38 and a distal end 40.

The proximal end 38 of the upper transverse member 36 of each mirror image structure 20 of each frame 18 has through bores 42 therethrough.

The through bores 42 of the proximal end 38 of the upper transverse member 36 of each mirror image structure 20 of each frame 18 are aligned with the through bores 30 of the uppermost end 26 of the upright member 22 of an associated mirror image structure 20 of an associated frame 18 so as to form upper aligned through bores 43.

The distal end 40 of the upper transverse member 36 of each mirror image structure 20 of each frame 18 has a through bore 44 therethrough.

Each mirror image structure 20 of each frame 18 further includes an upper set of nuts and bolts 46.

The upper set of nuts and bolts 46 of each mirror image structure 20 of each frame 18 secure through the upper aligned through bores 43 of an associated mirror image structure 20 of an associated frame 18 to thereby attach the upper transverse member 36 of the associated mirror image structure 20 of the associated frame 18 perpendicularly and coplanarly to the upright member 22 of the associated mirror image structure 20 of the associated frame 18.

The through bore 44 of the distal end 40 of the upper transverse member 36 of one mirror image structure 20 of one frame 18 is threaded.

The through bore 34 of the lowermost end 24 of the upright member 22 of one mirror image structure 20 of each frame 18 is threaded.

The one mirror image structure 20 of each frame 18 that has the through bore 34 of the lowermost end 24 of the upright member 22 thereof that is threaded is the one mirror image structure 20 of the one frame 18 that has the through bore 44 of the distal end 40 of the upper transverse member 36 that is threaded.

Each mirror image structure 20 of each frame 18 further includes an intermediate transverse member 48.

The intermediate transverse member 48 of each mirror image structure 20 of each frame 18 is horizontally oriented, flat for not damaging the top surface 14a of the unfolded and upright mattress 14 and the bottom surface 14b of the unfolded and upright mattress 14 when resting thereagainst during use, straight, slender, elongated, and has a proximal end 50 and a distal end 52.

The proximal end 50 of the intermediate transverse member 48 of each mirror image structure 20 of each frame 18 has through bores 54 therethrough.

The through bores 54 of the proximal end 50 of the intermediate transverse member 48 of each mirror image structure 20 of each frame 18 are aligned with the through bores 32 of the intermediate point 28 of the upright member 22 of an associated mirror image structure 20 of an associated frame 18 so as to form intermediate aligned through bores 56.

The distal end 52 of the intermediate transverse member 48 of each mirror image structure 20 of each frame 18 has through bores 57 therethrough.

Each mirror image structure 20 of each frame 18 further includes an intermediate set of nuts and bolts 58.

The intermediate set of nuts and bolts 58 of each mirror image structure 20 of each frame 18 secure through the intermediate aligned through bores 56 of an associated mirror image structure 20 of an associated frame 18 to thereby attach the intermediate transverse member 48 of the associated mirror image structure 20 of the associated frame 18 perpendicularly and coplanarly to the upright member 22 of the associated mirror image structure 20 of the associated frame 18, and be parallel to, and below, the upper transverse member 36 of the associated mirror image structure 20 of the associated frame 18.

The intermediate transverse member 48 of each mirror image structure 20 of each frame 18 further has a grip 60.

The grip 60 of the intermediate transverse member 48 of each mirror image structure 20 of each frame 18 is disposed on the distal end 52 of the intermediate transverse member 48 of each mirror image structure 20 of each frame 18 and is for forming a handle for the pair of movers 16 to grasp.

Each mirror image structure 20 of each frame 18 further includes a brace 62.

The brace 62 of each mirror image structure 20 of each frame 18 is diagonally oriented, flat for not damaging the top surface 14a of the unfolded and upright mattress 14 and the bottom surface 14b of the unfolded and upright mattress 14 when resting thereagainst during use, straight, slender, elongated, and has an upper end 64 and a lower end 66.

The upper end 64 of the brace 62 of each mirror image structure 20 of each frame 18 has a through bore 68 therethrough.

The through bore 68 of the upper end 64 of the brace 62 of each mirror image structure 20 of each frame 18 is aligned with a through bore 70 of the uppermost end 26 of the upright member 22 of an associated mirror image structure 20 of an associated frame 18 so as to form lower upper aligned through bores 72.

The lower end 66 of the brace 62 of each mirror image structure 20 of each frame 18 has a through bore 74 therethrough.

Each mirror image structure 20 of each frame 18 further includes a lower upper set of nuts and bolts 76.

The lower upper set of nuts and bolts 76 of each mirror image structure 20 of each frame 18 secure through the lower upper aligned through bores 72 of an associated mirror image structure 20 of an associated frame 18 to thereby attach the brace 62 of the associated mirror image structure 20 of the associated frame 18 diagonally and coplanarly to the upright member 22 of the associated mirror image structure 20 of the associated frame 18.

The through bore 74 of the lower end 66 of the brace 62 of each mirror image structure 20 of each frame 18 is aligned with an inner through bore 57 of the distal end 52 of the intermediate transverse member 48 of an associated mirror image structure 20 of an associated frame 18 so as to form lower aligned through bores 78.

Each mirror image structure 20 of each frame 18 further includes a lower set of nuts and bolts 80.

The lower set of nuts and bolts 80 of each mirror image structure 20 of each frame 18 secure through the lower aligned through bores 78 of an associated mirror image structure 20 of an associated frame 18 to thereby attach the brace 62 of the associated mirror image structure 20 of the associated frame 18 diagonally and coplanarly to the intermediate transverse member 48 of the associated mirror image structure 20 of the associated frame 18.

Each mirror image structure 20 of each frame 18 further includes an upper connector member 82.

The upper connector member 82 of each mirror image structure 20 of each frame 18 extends perpendicularly from the distal end 40 of the upper transverse member 36 of an associated mirror image structure 20 of an associated frame 18, and is coaxial with the through bore 44 of the distal end 40 of the upper transverse member 36 of the associated mirror image structure 20 of the associated frame 18, and is perpendicular to the upright member 22 of the associated mirror image structure 20 of the associated frame 18.

The upper connector member 82 of each mirror image structure 20 of each frame 18 is hollow, horizontally oriented, rectangular parallelepiped-shaped for not damaging an associated opposing end 12 of the unfolded and upright mattress 14 when resting thereagainst during use, straight, slender, and elongated.

The upper connector member 82 of each mirror image structure 20 of each frame 18 are telescopic with each other for allowing each frame 14 to fit more than one thickness unfolded and upright mattress 14.

Each mirror image structure 20 of each frame 18 further includes a lower connector member 84.

The lower connector member 84 of each mirror image structure 20 of each frame 18 extends perpendicularly from the lowermost end 24 of the upright member 22 of an associated mirror image structure 20 of an associated frame 18, is coaxial with the through bore 34 of the lowermost end 24 of the upright member 22 of the associated mirror image structure 20 of the associated frame 18, and is parallel to, and below, the upper connector member 82 of the associated mirror image structure 20 of the associated frame 18.

The lower connector member 84 of each mirror image structure 20 of each frame 18 is hollow, horizontally oriented, rectangular parallelepiped-shaped for not damaging an associated lower side 14c of the unfolded and upright mattress 14 when resting thereagainst during use, straight, slender, and elongated.

The lower connector member 84 of each mirror image structure 20 of each frame 18 are telescopic with each other for allowing each frame 14 to fit more than one thickness unfolded and upright mattress 14.

Each mirror image structure 20 of each frame 18 further includes a combination eye hook and chain 86.

An eye hook of the combination eye hook and chain 86 of each frame 18 is affixed in an outer through bore 57 of the distal end 52 of the intermediate transverse member 48 of one mirror image structure 20 of each frame 18.

A chain of the combination eye hook and chain 86 of each frame 18 is affixed in an outer through bore 57 of the distal end 52 of the intermediate transverse member 48 of the other mirror image structure 20 of each frame 18, engages the eye hook of the combination eye hook and chain 86 of an associated frame 18 during use, and is for draping in front of an associated opposing end 12 of the unfolded and upright mattress 14.

One mirror image structure 20 of each frame 18 further includes an upper locking member 88.

The upper locking member 88 of the one mirror image structure 20 of each frame 18 includes a threaded rod 90.

The threaded rod 90 of the upper locking member 88 of the one mirror image structure 20 of each frame 18 extends freely through the through bore 44 of the distal end 40 of the upper transverse member 36 of the one mirror image structure 20 of each frame 18, and threadably into the through bore 44 of the distal end 40 of the upper transverse member 36 of the other mirror image structure 20 of each frame 18 to thereby maintain the upper connector member 82 of each mirror image structure 20 of each frame 18 telescopically affixed with each other for allowing each frame 14 to affixedly fit more than one thickness unfolded and upright mattress 14.

The upper locking member 88 of the one mirror image structure 20 of each frame 18 includes a knob 92.

The knob 92 of the upper locking member 88 of the one mirror image structure 20 of each frame 18 is affixed to the threaded rod 90 of the upper locking member 88 of the one mirror image structure 20 of an associated frame 18 to facilitate rotation of the threaded rod 90 of the upper locking member 88 of the one mirror image structure 20 of the associated frame 18.

The one mirror image structure 20 of each frame 18 further includes a lower locking member 94.

The lower locking member 94 of the one mirror image structure 20 of each frame 18 includes a threaded rod 96.

The threaded rod 96 of the lower locking member 94 of the one mirror image structure 20 of each frame 18 extends freely through the through bore 34 of the lowermost end 24 of the upright member 22 of the one mirror image structure 20 of each frame 18, and threadably into the through bore 34 of the lowermost end 24 of the upright member 22 of the other mirror image structure 20 of each frame 18 to thereby maintain the lower connector member 84 of each mirror image structure 20 of each frame 18 telescopically affixed with each other for allowing each frame 14 to affixedly fit more than one thickness unfolded and upright mattress 14.

The lower locking member 94 of the one mirror image structure 20 of each frame 18 includes a knob 98.

The knob 98 of the lower locking member 94 of the one mirror image structure 20 of each frame 18 is affixed to the threaded rod 96 of the lower locking member 94 of the one mirror image structure 20 of an associated frame 18 to facilitate rotation of the threaded rod 96 of the lower locking member 94 of the one mirror image structure 20 of the associated frame 18.

It will be understood that each of the elements described above, or two or more together, may also find a useful application in other types of constructions differing from the types described above.

While the invention has been illustrated and described as embodiments of a mattress moving aid, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A carrier for detachably engaging opposing ends of an unfolded and upright mattress and for utilizing a pair of movers to move the unfolded and upright mattress, wherein the unfolded mattress further has a top surface, a bottom surface, and a pair of sides, said carrier comprising:

a pair of frames;
wherein said pair of frames are for detachably engaging the opposing ends of the unfolded and upright mattress, respectively; and
wherein said pair of frames are for utilizing the pair of movers to move the unfolded and upright mattress;
wherein each frame comprises a pair of mirror image structures; and
wherein said pair of mirror image structures of each frame are for maintaining the pair of opposing ends of the unfolded and upright mattress, respectively, therebetween;
wherein each mirror image structure of each frame includes an upright member;
wherein said upright member of each mirror image structure of each frame has:
a) a lowermost end;
b) an uppermost end; and
c) an intermediate point; and
wherein said intermediate point of each mirror image structure of each frame is disposed between said lowermost end of an associated mirror image structure of an associated frame and said uppermost end of said associated mirror image structure of said associated frame;
wherein said uppermost end of said upright member of each mirror image structure of each frame has through bores therethrough;
wherein said intermediate point of said upright member of each mirror image structure of each frame has through bores therethrough;
wherein said lowermost end of said upright member of each mirror image structure of each frame has a through bore therethrough;
wherein each mirror image structure of each frame includes an upper transverse member;
wherein said upper transverse member of each mirror image structure of each frame has:
a) a proximal end; and
b) a distal end;
wherein said distal end of said upper transverse member of each mirror image structure of each frame has a through bore therethrough.

2. The carrier of claim 1, wherein said upright member of each mirror image structure of each frame is vertically oriented.

3. The carrier of claim 1, wherein said upright member of each mirror image structure of each frame is flat for not damaging the top surface of the unfolded and upright mattress and the bottom surface of the unfolded and upright mattress when resting thereagainst during use.

4. The carrier of claim 1, wherein said upright member of each mirror image structure of each frame is slender.

5. The carrier of claim 1, wherein said upright member of each mirror image structure of each frame is elongated.

6. The carrier of claim 1, wherein said upright member of each mirror image structure of each frame is straight.

7. The carrier of claim 1, wherein said upper transverse member of each mirror image structure of each frame is horizontally oriented.

8. The carrier of claim 1, wherein said upper transverse member of each mirror image structure of each frame is flat for not damaging the top surface of the unfolded and upright mattress and the bottom surface of the unfolded and upright mattress when resting thereagainst during use.

9. The carrier of claim 1, wherein said upper transverse member of each mirror image structure of each frame is straight.

10. The carrier of claim 1, wherein said upper transverse member of each mirror image structure of each frame is slender.

11. The carrier of claim 1, wherein said upper transverse member of each mirror image structure of each frame is elongated.

12. The carrier of claim 1, wherein said proximal end of said upper transverse member of each mirror image structure of each frame has through bores therethrough.

13. The carrier of claim 12, wherein said through bores of said proximal end of said upper transverse member of each mirror image structure of each frame are aligned with said through bores of said uppermost end of said upright member of an associated mirror image structure of an associated frame so as to form upper aligned through bores.

14. The carrier of claim 13, wherein each mirror image structure of each frame includes an upper set of nuts and bolts.

15. The carrier of claim 14, wherein said upper set of nuts and bolts of each mirror image structure of each frame secure through said upper aligned through bores of an associated mirror image structure of an associated frame to thereby attach said upper transverse member of said associated mirror image structure of said associated frame perpendicularly to said upright member of said associated mirror image structure of said associated frame.

16. The carrier of claim 1, wherein said through bore of said distal end of said upper transverse member of one mirror image structure of each frame is threaded.

17. The carrier of claim 16, wherein said through bore of said lowermost end of said upright member of one mirror image structure of each frame is threaded.

18. The carrier of claim 17, wherein said one mirror image structure of each frame that has said through bore of said lowermost end of said upright member thereof that is threaded is said one mirror image structure of said one frame that has said through bore of said distal end of said upper transverse member that is threaded.

19. The carrier of claim 1, wherein each mirror image structure of each frame includes an intermediate transverse member.

20. The carrier of claim 19, wherein said intermediate transverse member of each mirror image structure of each frame is horizontally oriented.

21. The carrier of claim 19, wherein said intermediate transverse member of each mirror image structure of each frame is flat for not damaging the top surface of the unfolded and upright mattress and the bottom surface of the unfolded and upright mattress when resting thereagainst during use.

22. The carrier of claim 19, wherein said intermediate transverse member of each mirror image structure of each frame is straight.

23. The carrier of claim 19, wherein said intermediate transverse member of each mirror image structure of each frame is slender.

24. The carrier of claim 19, wherein said intermediate transverse member of each mirror image structure of each frame is elongated.

25. The carrier of claim 19, wherein said intermediate transverse member of each mirror image structure of each frame has:
a) a proximal end; and
b) a distal end.

26. The carrier of claim 25, wherein said proximal end of said intermediate transverse member of each mirror image structure of each frame has through bores therethrough.

27. The carrier of claim 26, wherein said through bores of said proximal end of said intermediate transverse member of each mirror image structure of each frame are aligned with said through bores of said intermediate point of said upright member of an associated mirror image structure of an associated frame so as to form intermediate aligned through bores.

28. The carrier of claim 27, wherein each mirror image structure of each frame includes an intermediate set of nuts and bolts.

29. The carrier of claim 28, wherein said intermediate set of nuts and bolts of each mirror image structure of each frame secure through said intermediate aligned through bores of an associated mirror image structure of an associated frame to thereby attach said intermediate transverse member of said associated mirror image structure of said associated frame perpendicularly to said upright member of said associated mirror image structure of said associated frame.

30. The carrier of claim 25, wherein said distal end of said intermediate transverse member of each mirror image structure of each frame has through bores therethrough.

31. The carrier of claim 30, wherein each mirror image structure of each frame includes a brace.

32. The carrier of claim 31, wherein said brace of each mirror image structure of each frame is diagonally oriented.

33. The carrier of claim 31, wherein said brace of each mirror image structure of each frame is flat for not damaging the top surface of the unfolded and upright mattress and the bottom surface of the unfolded and upright mattress when resting thereagainst during use.

34. The carrier of claim 31, wherein said brace of each mirror image structure of each frame is straight.

35. The carrier of claim 31, wherein said brace of each mirror image structure of each frame is slender.

36. The carrier of claim 31, wherein said brace of each mirror image structure of each frame is elongated.

37. The carrier of claim 31, wherein said brace of each mirror image structure of each frame has:
   a) an upper end; and
   b) a lower end.

38. The carrier of claim 37, wherein said upper end of said brace of each mirror image structure of each frame has a through bore therethrough.

39. The carrier of claim 38, wherein said through bore of said upper end of said brace of each mirror image structure of each frame is aligned with a through bore of said uppermost end of said upright member of an associated mirror image structure of an associated frame so as to form lower upper aligned through bores.

40. The carrier of claim 39, wherein each mirror image structure of each frame includes a lower upper set of nuts and bolts.

41. The carrier of claim 40, wherein said lower upper set of nuts and bolts of each mirror image structure of each frame secure through said lower upper aligned through bores of an associated mirror image structure of an associated frame to thereby attach said brace of said associated mirror image structure of said associated frame diagonally to said upright member of said associated mirror image structure of said associated frame.

42. The carrier of claim 37, wherein said lower end of said brace of each mirror image structure of each frame has a through bore therethrough.

43. The carrier of claim 42, wherein said through bore of said lower end of said brace of each mirror image structure of each frame is aligned with an inner through bore of said distal end of said intermediate transverse member of an associated mirror image structure of an associated frame so as to form lower aligned through bores.

44. The carrier of claim 43, wherein each mirror image structure of each frame includes a lower set of nuts and bolts.

45. The carrier of claim 44, wherein said lower set of nuts and bolts of each mirror image structure of each frame secure through said lower aligned through bores of an associated mirror image structure of an associated frame to thereby attach said brace of said associated mirror image structure of said associated frame diagonally to said intermediate transverse member of said associated mirror image structure of said associated frame.

46. The carrier of claim 31, wherein said brace of each mirror image structure of each frame and said upright member of an associated mirror image structure of an associated frame are coplanar with each other.

47. The carrier of claim 30, wherein each mirror image structure of each frame includes a combination eye hook and chain.

48. The carrier of claim 47, wherein an eye hook of said combination eye hook and chain of each frame is affixed in an outer through bore of said distal end of said intermediate transverse member of one mirror image structure of each frame.

49. The carrier of claim 48, wherein a chain of said combination eye hook and chain of each frame is affixed in an outer through bore of said distal end of said intermediate transverse member of the other mirror image structure of each frame; and
   wherein said chain of said combination eye hook and chain of each frame is for draping in front of an associated opposing end of the unfolded and upright mattress.

50. The carrier of claim 49, wherein said chain of said combination eye hook and chain of each frame engages said eye hook of said combination eye hook and chain of an associated frame during use.

51. The carrier of claim 25, wherein said intermediate transverse member of each mirror image structure of each frame has a grip.

52. The carrier of claim 51, wherein said grip of said intermediate transverse member of each mirror image structure of each frame is disposed on said distal end of said intermediate transverse member of each mirror image structure of each frame and is for forming a handle for the pair of movers to grasp.

53. The carrier of claim 19, wherein said intermediate transverse member of each mirror image structure of each frame and said upright member of an associated mirror image structure of an associated frame are coplanar with each other.

54. The carrier of claim 19, wherein said intermediate transverse member of each mirror image structure of each frame is parallel to said upper transverse member of an associated mirror image structure of an associated frame.

55. The carrier of claim 19, wherein said intermediate transverse member of each mirror image structure of each frame is below said upper transverse member of an associated mirror image structure of an associated frame.

56. The carrier of claim 1, wherein each mirror image structure of each frame includes an upper connector member.

57. The carrier of claim 56, wherein said upper connector member of each mirror image structure of each frame extends perpendicularly from said distal end of said upper transverse member of an associated mirror image structure of an associated frame.

58. The carrier of claim 56, wherein said upper connector member of each mirror image structure of each frame is coaxial with said through bore of said distal end of said upper transverse member of an associated mirror image structure of an associated frame.

59. The carrier of claim 56, wherein said upper connector member of each mirror image structure of each frame is hollow.

60. The carrier of claim 56, wherein said upper connector member of each mirror image structure of each frame is horizontally oriented.

61. The carrier of claim 56, wherein said upper connector member of each mirror image structure of each frame is rectangular parallelepiped-shaped for not damaging an associated opposing end of the unfolded and upright mattress when resting thereagainst during use.

62. The carrier of claim 56, wherein said upper connector member of each mirror image structure of each frame is straight.

63. The carrier of claim 56, wherein said upper connector member of each mirror image structure of each frame is slender.

64. The carrier of claim 56, wherein said upper connector member of each mirror image structure of each frame is elongated.

65. The carrier of claim 56, wherein said upper connector member of each mirror image structure of each frame are telescopic with each other for allowing each frame to fit more than one thickness unfolded and upright mattress.

66. The carrier of claim 56, wherein each mirror image structure of each frame includes a lower connector member.

67. The carrier of claim 66, wherein said lower connector member of each mirror image structure of each frame extends perpendicularly from said lowermost end of said upright member of an associated mirror image structure of an associated frame.

68. The carrier of claim 66, wherein said lower connector member of each mirror image structure of each frame is parallel to said upper connector member of an associated mirror image structure of an associated frame.

69. The carrier of claim 66, wherein said lower connector member of each mirror image structure of each frame is below said upper connector member of an associated mirror image structure of an associated frame.

70. The carrier of claim 66, wherein said lower connector member of each mirror image structure of each frame is hollow.

71. The carrier of claim 66, wherein said lower connector member of each mirror image structure of each frame is horizontally oriented.

72. The carrier of claim 66, wherein said lower connector member of each mirror image structure of each frame is rectangular parallelepiped-shaped for not damaging a lower side of the unfolded and upright mattress when resting thereagainst during use.

73. The carrier of claim 66, wherein said lower connector member of each mirror image structure of each frame is straight.

74. The carrier of claim 66, wherein said lower connector member of each mirror image structure of each frame is slender.

75. The carrier of claim 66, wherein said lower connector member of each mirror image structure of each frame is elongated.

76. The carrier of claim 66, wherein said lower connector member of each mirror image structure of each frame are telescopic with each other for allowing each frame to fit more than one thickness unfolded and upright mattress.

77. The carrier of claim 66, wherein said lower connector member of each mirror image structure of each frame is coaxial with said through bore of said lowermost end of said upright member of an associated mirror image structure of an associated frame.

78. The carrier of claim 56, wherein said upper connector member of each mirror image structure of each frame is perpendicular to said upright member of an associated mirror image structure of an associated frame.

79. The carrier of claim 1, wherein said upper transverse member of each mirror image structure of each frame and said upright member of an associated mirror image structure of an associated frame are coplanar with each other.

80. The carrier of claim 1, wherein one mirror image structure of each frame includes an upper locking member.

81. The carrier of claim 80, wherein said upper locking member of said one mirror image structure of each frame includes a threaded rod.

82. The carrier of claim 81, wherein said upper locking member of said one mirror image structure of each frame includes a knob.

83. The carrier of claim 82, wherein said knob of said upper locking member of said one mirror image structure of each frame is affixed to said threaded rod of said upper locking member of said one mirror image structure of an associated frame to facilitate rotation of said threaded rod of said upper locking member of said one mirror image structure of said associated frame.

84. The carrier of claim 1, wherein said one mirror image structure of each frame includes a lower locking member.

85. The carrier of claim 84, wherein said lower locking member of said one mirror image structure of each frame includes a threaded rod.

86. The carrier of claim 85, wherein said lower locking member of said one mirror image structure of each frame includes a knob.

87. The carrier of claim 86, wherein said knob of said lower locking member of said one mirror image structure of each frame is affixed to said threaded rod of said lower locking member of said one mirror image structure of an associated frame to facilitate rotation of said threaded rod of said lower locking member of said one mirror image structure of said associated frame.

* * * * *